United States Patent
Park et al.

(10) Patent No.: US 8,521,330 B2
(45) Date of Patent: Aug. 27, 2013

(54) MAP BUILDING APPARATUS AND METHOD

(75) Inventors: Jun-ho Park, Hwaseong-si (KR); Woo-yeon Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 781 days.

(21) Appl. No.: 12/654,680

(22) Filed: Dec. 29, 2009

(65) Prior Publication Data

US 2010/0217439 A1     Aug. 26, 2010

(30) Foreign Application Priority Data

Feb. 23, 2009  (KR) ................ 10-2009-0014975

(51) Int. Cl.
*G05B 15/00*    (2006.01)

(52) U.S. Cl.
USPC .................................. 700/258; 901/1; 901/47

(58) Field of Classification Search
None
See application file for complete search history.

(56) References Cited

U.S. PATENT DOCUMENTS

| | | | |
|---|---|---|---|
| 7,539,557 B2 * | 5/2009 | Yamauchi ............... | 700/245 |
| 2007/0065041 A1 * | 3/2007 | Ming ....................... | 382/284 |
| 2007/0293985 A1 | 12/2007 | Myeong et al. | |
| 2008/0294338 A1 | 11/2008 | Doh et al. | |

FOREIGN PATENT DOCUMENTS

| | | |
|---|---|---|
| JP | 2006-215860 | 8/2006 |
| JP | 2008-4078 | 1/2008 |
| KR | 10-2007-0060954 | 6/2007 |
| KR | 10-2007-0072449 | 7/2007 |

OTHER PUBLICATIONS

K. Ho, P. Newman, Multiple Map Intersection Detection using Visual Appearance, In 3rd International Conference on Computational Intelligence, Robotics and Autonomous Systems. Singapore. Dec. 2005.*
Sharp GP2Y0A21YK Data sheet, 2005, pp. 1-10.*
Heon-Hui Kim, Yun-Su Ha, Gang-Gyoo Jin, A Study on the Environmental Map Building for a Mobile Robot Using Infrared Range Finder Sensors, Oct. 2003, Intl Conference on Intelligent Robots and Systems, 711-716 vol. 1.*

* cited by examiner

*Primary Examiner* — Khoi Tran
*Assistant Examiner* — Ryan Rink
(74) *Attorney, Agent, or Firm* — Staas & Halsey LLP

(57) ABSTRACT

Disclosed are a map building apparatus and method using a distance measurement. According to an aspect, by creating a first map and a second map respectively using the characteristics of different characteristic areas based on a distance-voltage characteristics of a distance measurement sensor, and combining the first map with the second map, a grid map is created. Accordingly, since a map regarding a peripheral environment is created using plural areas of the distance-voltage characteristics, a more accurate map may be created.

22 Claims, 15 Drawing Sheets

MAP BUILDING APPARATUS AND METHOD

CROSS-REFERENCE TO RELATED APPLICATIONS

This application claims the benefit under 35 U.S.C. §119(a) of Korean Patent Application No. 10-2009-14975, filed on Feb. 23, 2009, the disclosure of which is incorporated by reference in its entirety for all purposes.

BACKGROUND

1. Field

One or more embodiments relate to a technology for building a map regarding a peripheral environment using a distance measurement sensor, and more particularly, to a technology accommodating a mobile robot to build a grid map using a distance measurement sensor.

2. Description of the Related Art

In some sense, the term "robot" has previously been considered an automaton in which mechanical equipment is installed, e.g., in a generally human shaped form to allow hands, feet, body, etc., thereof to operate automatically as if they were those of a human. However, the term "robot" also extends to any arbitrarily-shaped automaton that can perform given tasks automatically, for example.

Specifically, in the case of a mobile robot, its application range is expected to be extended so it can perform tasks in a desired location, for example, in severe environments or in dangerous regions. The concept of a home mobile robot, such as a cleaning robot, which helps with household chores while wandering about inside the house, has also been popularized.

In order for a mobile robot to perform its tasks while wandering about automatically, for example, it is desirable to make the mobile robot recognize its peripheral environment. The robot's recognition on a peripheral environment generally depends on a map. An example of such a map is a grid map where a corresponding peripheral space is partitioned by same-sized squares indicating whether an object exists in each square. A robot may create such a grid map regarding its peripheral environment using a distance measurement sensor, for example.

The distance measurement sensor may measure distances from itself to peripheral objects and output predetermined voltages, for example, based on the results of the measurement. The robot may, thus, create a grid map using the example output voltages. However, in the case where certain output voltages correspond to the same distance value in the distance-voltage characteristics of the distance-voltage sensor, as further explained below, the output from distance measurement sensor makes it unclear as to which distance value represented by the output voltages is the correct distance value when creating a map, which lowers the accuracy of the created map.

SUMMARY

One or more embodiments relate to an apparatus and method for precisely building a grip map using a distance measurement.

In one or more embodiments, there is provided a map building apparatus including a base map building unit to generate a first map and a second map based on an output distance measurement indicating signal, of a measurement sensor, with the output distance measurement indicating signal representing at least two different distances for a same output signal, and a final map building unit to selectively combine portions of the first map with portions of the second map to create a third map, wherein the first map and the second map overlap.

The output distance measurement indicating signal may represent the at least two different distances for the same output signal according to respective different characteristic areas along a defined distance-voltage characteristic curve of the measurement sensor, with the different characteristic areas being separated along the distance-voltage characteristic curve based on a point on the distance-voltage characteristic curve where the distance measurement sensor outputs a peak voltage.

Further, the output distance measurement indicating signal represents the at least two different distances for the same output signal according to respective different characteristic areas along a defined distance-voltage characteristic curve of the measurement sensor, and the base map building unit may further include a first base map builder to generate the first map based on distances, represented by the output distance measurement indicating signal according to a first characteristic area of the different characteristic areas of the distance-voltage characteristic curve, increasing proportionally with an increase in output voltage of the output distance measurement indicating signal, and a second base map builder to generate the second map based on distances, represented by the output distance measurement indicating signal according to a second characteristic area of the different characteristic areas of the distance-voltage characteristic curve, increasing proportionally with a decrease in output voltage of the output distance measurement indicating signal.

The final map building unit may include a map combiner to combine the first map with the second map, an intersection extractor to extract intersections between the first map and the second map, and a straight line extractor to select straight lines from among lines of the first and second maps for each section which is defined as an area between neighboring intersections of the extracted intersections, to create the third map using the selected straight lines.

The final map building unit may include a map combiner to combine the first map with the second map, an intersection extractor to extract intersections between the first map and the second map, a candidate map builder to select any one of a line of the first map and a line of the second map for each section which is defined as an area between neighboring intersections of the extracted intersections, to create at least two candidate maps using the selected lines, and a map selector to select a map from the at least two candidate maps as the third map.

The candidate map builder may select a line of the first map and a line of the second map, alternately, for each section.

The map selector may select a candidate map having more continuous lines with respect to the intersections from the at least two candidate maps as the third map.

The map selector may select a candidate map having more straight lines with respect to the intersections from the at least two candidate maps as the third map.

The map selector may select a candidate map having more straight lines including the intersections from the at least two candidate maps as the third map.

Further, the first and second maps may be grid maps of equal sized grids.

In one or more embodiments, there is provided a map building method including generating a first map and a second map based on an output distance measurement indicating signal, of a measurement sensor, with the output distance measurement indicating signal representing at least two different distances for a same output signal, and building a third map by selectively combining portions of the first map with portions of the second map to create the third map, wherein the first map and the second map overlap.

The output distance measurement indicating signal may represent the at least two different distances for the same output signal according to respective different characteristic areas along a defined distance-voltage characteristic curve of the measurement sensor, with the different characteristic areas being separated along the distance-voltage characteristic curve based on a point on the distance-voltage characteristic curve where the distance measurement sensor outputs a peak voltage.

The output distance measurement indicating signal may represent the at least two different distances for the same output signal according to respective different characteristic areas along a defined distance-voltage characteristic curve of the measurement sensor, with the generating of the first map including generating the first map based on distances, represented by the output distance measurement indicating signal according to a first characteristic area of the different characteristic areas of the distance-voltage characteristic curve, increasing proportionally with an increase in output voltage of the output distance measurement indicating signal, and with the generating of the second map including generating the second map based on distances, represented by the output distance measurement indicating signal according to a second characteristic area of the different characteristic areas of the distance-voltage characteristic curve, increasing proportionally with a decrease in output voltage of the output distance measurement indicating signal.

The building of the third map may include combining the first map with the second map, extracting intersections between the first map and the second map, selecting straight lines from among lines of the first and second maps for each section which is defined as an area between neighboring intersections of the extracted intersections, and creating the third map using the selected straight lines.

The building of the third map may include combining the first map with the second map, extracting intersections between the first map and the second map, selecting any one of a line of the first map and a line of the second map for each section which is defined as an area between neighboring intersections of the extracted intersections, creating at least two candidate maps using the selected lines, and selecting a map from the at least two candidate maps as the third map.

The selecting of the map from the at least two candidate maps may include selecting a line of the first map and a line of the second map, alternately, for each section.

The selecting of the map from the at least two candidate maps may include selecting a candidate map having more continuous lines with respect to the intersections from the at least two candidate maps as the third map.

The selecting of the map from the at least two candidate maps may include selecting a candidate map having more straight lines with respect to the intersections from the at least two candidate maps as the third map.

The selecting of the map from the at least two candidate maps may include selecting a candidate map having more straight lines including the intersections from the at least two candidate maps as the third map.

The first and second maps may be grid maps of equal sized grids.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
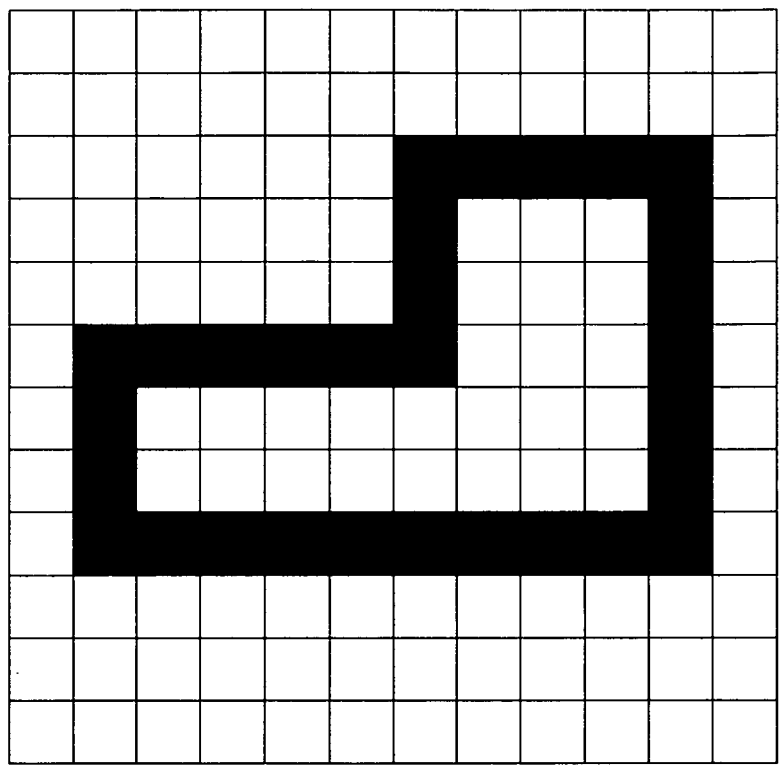
FIG. 1 shows a grid map according to an embodiment.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 shows a map according to an embodiment. Referring to FIG. 1, the map may be a grid map. The grid map partitions a given space into a plurality of regular sized portions, e.g., square portions that respectively represent whether an object exists within each portion. In an embodiment, the grid map may thereby include the plural regular sized portions in an equal dimension format.

For example, the illustrated empty portions of the grid map shown in FIG. 1 represent an area where no object exists, while the full, or black, portions of the grid map represent respective areas where one or more objects exists. Accordingly, an edge of connecting full portions may represent a wall, an obstacle, etc., in a certain space.

Here, a process of building or creating a map is to draw such an edge or line connecting the full portions in a grip map. Such a grid map may be created by any device which can measure distances to certain peripheral objects, including a robot including a capability to measure distances, or obtain information of the same.

Figure 2:
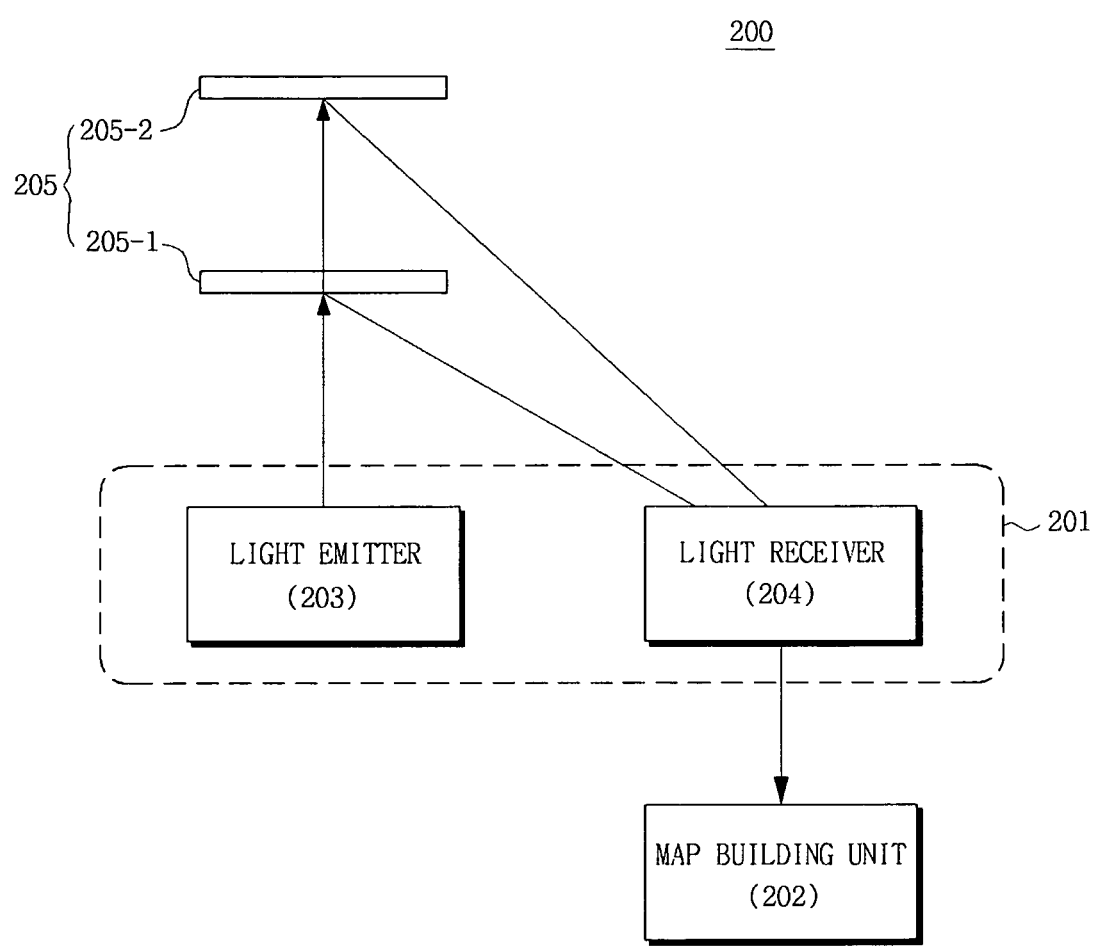
FIG. 2 illustrates a map building apparatus according to an embodiment.

FIG. 2 illustrates a map building apparatus 200 according to an embodiment. Referring to FIG. 2, in an embodiment, the map building apparatus 200 may include a distance measurement sensor 201 and a map building unit 202, for example.

As an example, the distance measurement sensor 201 may emit light and detect light reflected by any peripheral object to thereby calculate the distance between the distance measurement sensor 201 and the object by analyzing the detected light.

In an embodiment, the distance measurement sensor 201 may include a light emitter 203 and a light receiver 204 for performing this distance measurement. For example, the light emitter 203 may be a light emission diode (LED) which emits light, and the light receiver 204 may be a position sensitive detector (PSD) which detects light reflected by objects 205 and may calculate distances to the objects 205 by analyzing the detected light.

The light receiver 204 may calculate the distances to the objects 205 using triangulation. As illustrated in FIG. 2, incident locations of the light beams reflected by the objects 205 to the light receiver 204 directly relate to the distances between the light emitter 203 to the objects 205. For example, with the arrangement shown in FIG. 2, light reflected by an object located relatively close to the light emitter 203, i.e., object 205-1, may be incident on the light receiver 204 along a more left side of the light receiver 204, while light reflected by an object located relatively far from the light emitter 203, i.e., object 205-2, would be incident on the light receiver 204 along a more right side of the light receiver 204. Accordingly, the light receiver 204 may calculate distances to objects based on the locations relative to the light receiver 204 of incident light, as reflected by the objects.

As only an example, these measured distances to the objects 205 may be converted into output voltages. For example, the light receiver 204 may output a voltage signal proportional or inverse-proportional to the measured distances. The map building unit 202 may then build a grid map, for example, as illustrated in FIG. 1, based on such received respective voltage signals from the light receiver 204.

Figure 3:
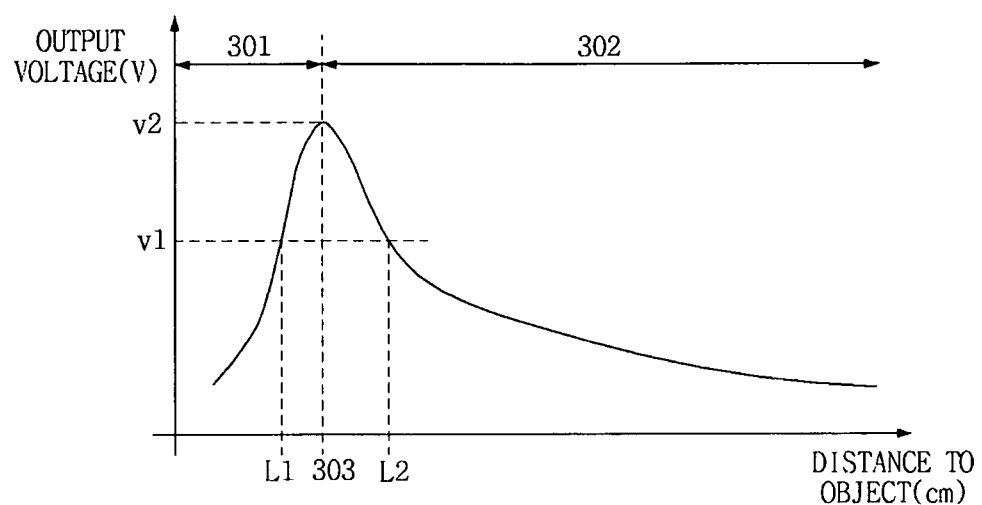
FIG. 3 is a graph showing distance-voltage characteristics/curve of a distance measurement sensor, according to an embodiment.

FIG. 3 is a graph showing an example distance-voltage characteristic curve of a distance measurement sensor 201, according to an embodiment. Here, such a distance-voltage characteristic curve may be a defined distance-voltage characteristic curve of the measurement sensor, for example. The defined distance-voltage characteristic curve may be predetermined.

Here, the distance-voltage characteristic represents a relationship between a distance from the distance measurement sensor 201 to a certain object, e.g., as calculated by the distance measurement sensor 201, and a corresponding output voltage. For example, the greater the measured distance value, the higher the output voltage from the distance measurement sensor 201. Alternatively, as another example, it may also be possible that the greater the measured distance value, the lower the output voltage from the distance measurement sensor 201.

Referring to FIG. 3, the example distance measurement sensor 201 has two different characteristic areas.

In the first characteristic area 301, measured distances are proportional to output voltage. That is, in the first characteristic area 301, as the measured distance to a certain object increases, the output voltage also increases.

In the second characteristic area 302, measured distances are inversely-proportional to output voltage. Accordingly, in the second characteristic area 302, as the measured distance to a certain object increases, the output voltage output actually decreases.

The first characteristic area 301 and the second characteristic area 302 can, thus, be sectioned according to a threshold distance 303. The threshold distance 303 may be a distance at which a peak voltage V2 is output. In addition, the threshold distance 303 may represent a measured distance where a differential value of the output voltage is zero.

The first characteristic area 301, including measured distances shorter than the threshold distance 303, may be called a short-distance area, and the second characteristic area 303, including measured distances longer than the threshold distance 303, may be called a long-distance area.

However, when the distance measurement sensor 201 outputs the voltage V1, a problem occurs as to whether to consider the measured distance to the corresponding object is the short distance L1 or the long distance L2. In this case, either of the short distance L1 and long distance L2 could be chosen as the measured distance by selecting any one of the first and second characteristic areas 301 and 302. Thus, there is a conventional potential for the mischaracterization of the measured distance when the same voltage is output. However, in one or more embodiments, the map building apparatus 200 can use both of the two characteristic areas 301 and 302 and may further avoid such mischaracterizations. According to one or more embodiments, such a operation will be described in more detail with reference to FIG. 4 below.

Figure 4:
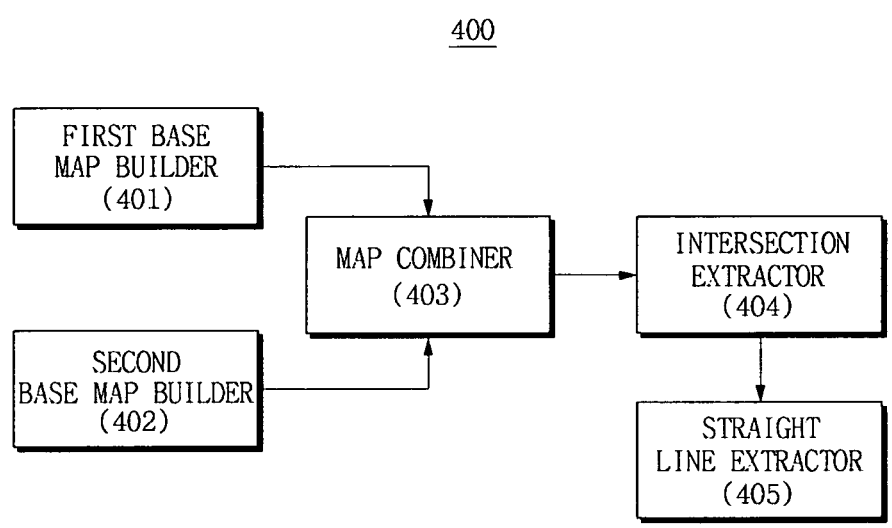
FIG. 4 is a block diagram illustrating a map building apparatus according to an embodiment.

FIG. 4 is a block diagram illustrating a map building apparatus 400 according to an embodiment, and is an example of the map building unit 201 illustrated in FIG. 2.

Referring to FIG. 4, the map building apparatus 400 may select first and second characteristic areas 301 and 302 (see FIG. 3) based on the distance-voltage characteristics of a distance measurement sensor to create a respective first grid map and a second grid map, and may then combine elements of the first grid map with elements of the second grid map, thereby generating a complex grid map. In this example embodiment, two grid maps are generated from respective non-overlapping output voltage ranges, noting that embodiments of the present invention are not limited to the same.

For this operation, the map building apparatus 400 may include a first base map builder 401, a second base map builder 402, a map combiner 403, an intersection extractor 404, and a straight line extractor 405, for example.

The first base map builder 401 may select a first characteristic area 301 with reference to the distance-voltage characteristics of the distance measurement sensor, and create a first grid map. For example, the first grid map may be a grid map corresponding to a short-distance area to which distances shorter than the threshold distance 303 belong.

The second base map builder 402 may accordingly select a second characteristic area 302 with reference to the distance-voltage characteristics of the distance measurement sensor, thus creating a second grid map. For example, the second grid map may be a grid map corresponding to a long-distance area representing distances longer than the threshold distance 303.

The map combiner 403 may thereby combine the first grid map and the second grid map. For example, the map combiner 403 may create a complex grid map by overlapping the second grid map with the first grid map.

The intersection extractor 404 may extract intersections of the first grid map and the second grid map.

In an embodiment, the straight line extractor 405 may further extract straight lines from among lines of the first and second grid maps for each section which is defined as the area between neighboring intersections, for example, thus completing a final grid map using the extracted straight lines.

Hereinafter, the operation of a map building apparatus 400, such as that illustrated in FIG. 4, will be described in more detail with reference to FIGS. 5 through 9.

Figure 5:
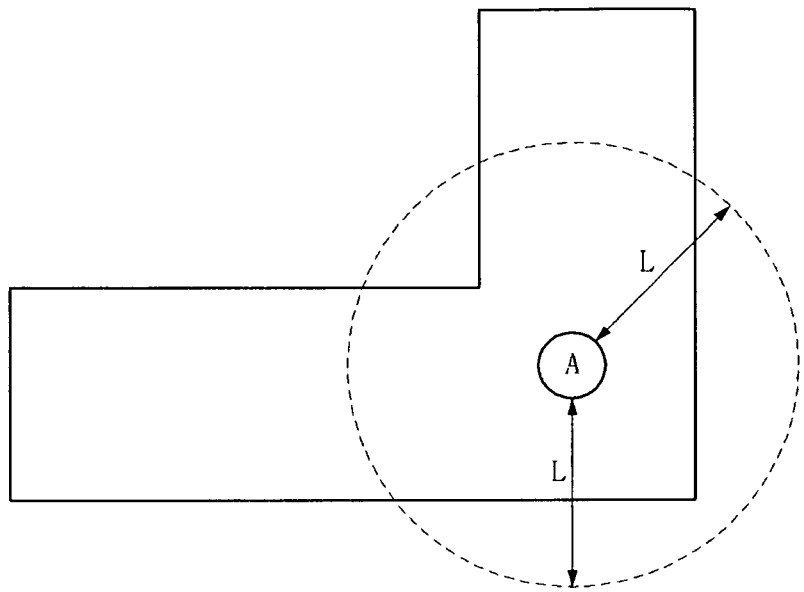
FIG. 5 illustrates a peripheral environment according to an embodiment.

FIG. 5 illustrates a peripheral environment. In FIG. 5, "A" represents a map building apparatus, such as the map building apparatus of FIG. 4. For example, in FIG. 5, "A" may be a robot as the map building apparatus, and "L" represents a threshold distance, such as distance 303 of FIG. 3, distinguishing different characteristic areas in the distance-voltage characteristics of a distance measurement sensor.

Figure 6:
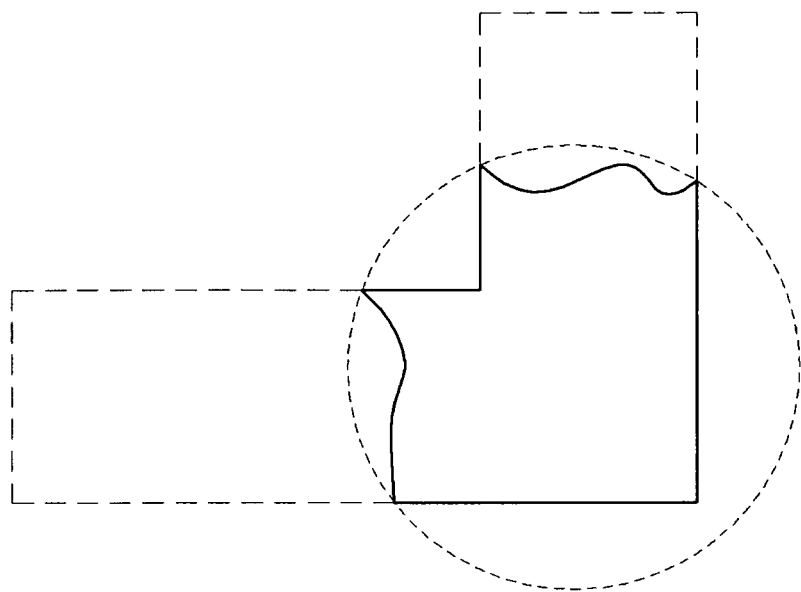
FIG. 6 illustrates a first grid map according to an embodiment.

FIG. 6 illustrates a first grid map created by a first base map builder, such as the first base map builder 401 of FIG. 4, according to an embodiment.

Referring to FIGS. 3, 4 and 6, the first base map builder may select, when receiving a certain voltage from a distance measurement sensor, a first characteristic area, e.g., a short-distance area. Accordingly, objects located closer than the threshold distance L will be represented more accurately, but objects located farther than the threshold distance L may be represented less accurately.

Figure 7:
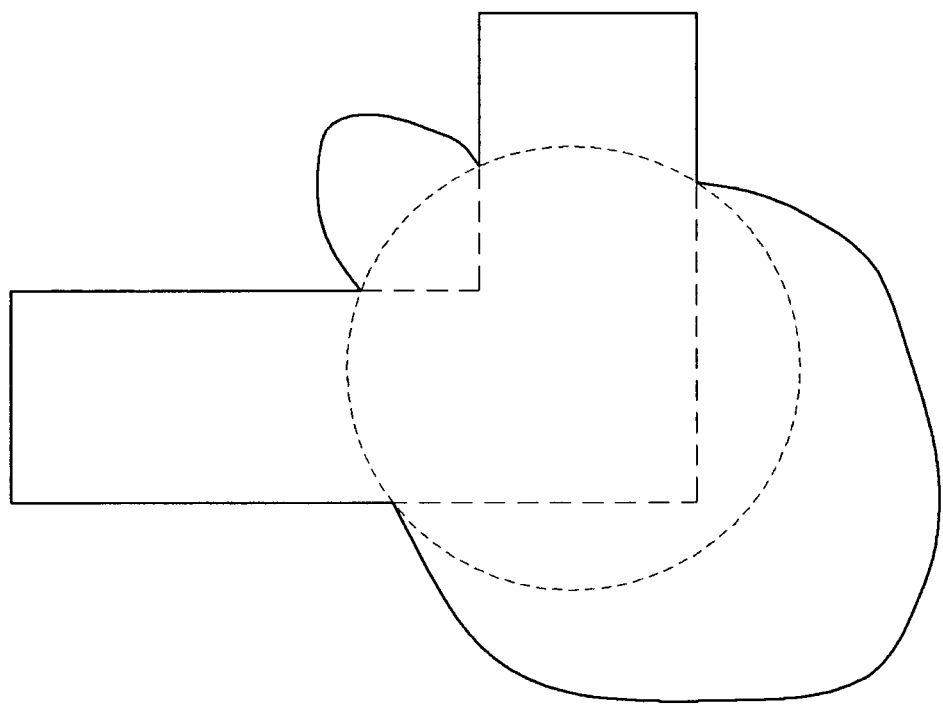
FIG. 7 illustrates a second grid map according to an embodiment.

FIG. 7 illustrates a second grid map created by a second base map builder, such as the second map builder 402, according to an embodiment.

In FIG. 7, the second base map builder may select, when receiving a certain voltage from the distance measurement sensor, a second characteristic area, e.g., a long-distance area. Accordingly, objects located farther than the threshold distance L will be represented more accurately, but objects located closer than the threshold distance L may be represented less accurately.

Figure 8:
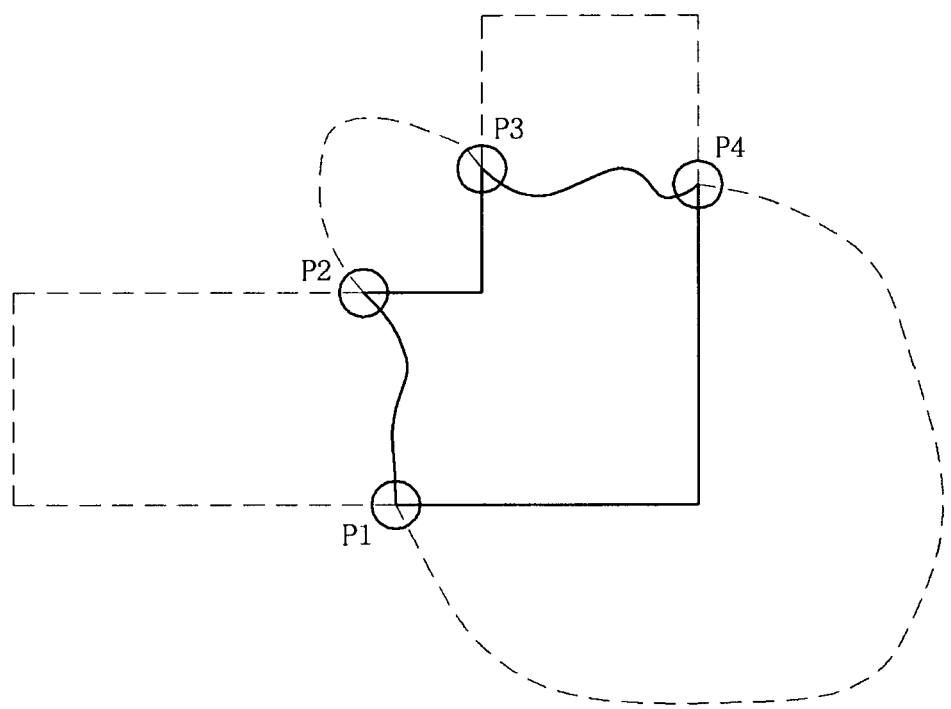
FIG. 8 illustrates a complex grid map according to an embodiment.

FIG. 8 illustrates a complex grid map combined by a map combiner and intersections extracted by an intersection extractor, according to an embodiment. In FIG. 8, for convenience of description, the first grid map is represented by straight lines and the second grid map is represented by dashed lines. In addition, points/areas P1 through P4 denote intersections between the two example grid maps.

FIG. 8 will now be described to demonstrate an example process in which a straight line extractor, such as the straight line extractor 405 of FIG. 4, extracts straight lines to complete a complex grid map.

First, the straight line extractor may designate predetermined sections of the complex map according to the identified intersections. For example, the straight line extractor may designate sections as follows:

P1-P2: first section
P2-P3: second section
P3-P4: third section
P4-P1: fourth section Then, the straight line extractor may extract or interpolate straight lines from among the lines of the first and second grid maps for each section. For example, the straight line extractor 405 may extract the lines of the second grid map, which are represented by dashed lines in the first section P1-P2, and extract the lines of the first grid map, which are represented by solid lines. Likewise, when the straight line extractor 405 extracts straight lines in the third and fourth sections P3-P4 and P4-P1, the resultant grid map appears as shown in FIG. 9.

Figure 9:
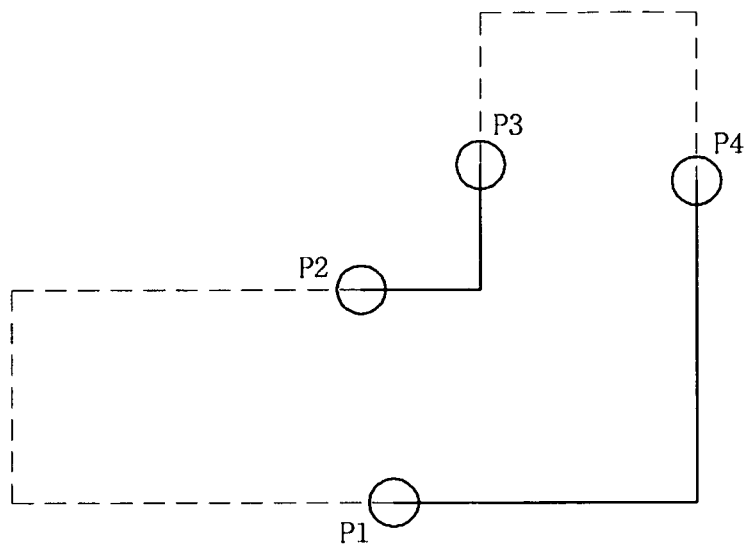
FIG. 9 illustrates a final grid map according to an embodiment.

FIG. 9 shows lines extracted by such a straight line extractor. Comparing FIG. 9 with FIG. 5, it can be seen that FIG. 9 shows a grid map to which the peripheral environment of A is reflected.

Figure 10:
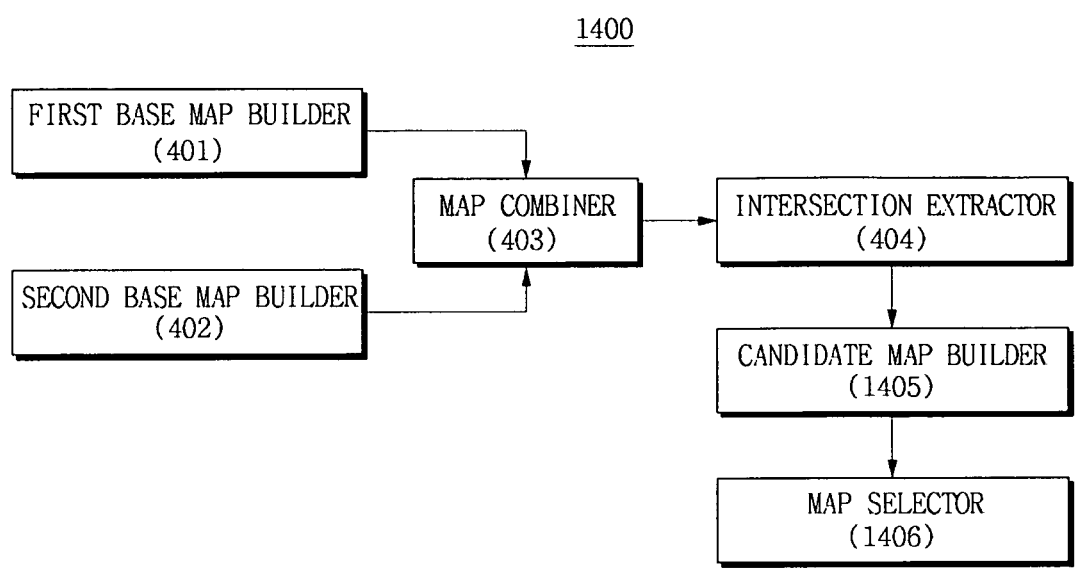
FIG. 10 is a block diagram illustrating a map building apparatus according to an embodiment.

FIG. 10 is a block diagram illustrating a map building apparatus 1400 according to an embodiment, and is another example of the map building unit 201 illustrated in FIG. 2.

In FIG. 10, the map building apparatus 1400 may select first and second characteristic areas, such as first and second characteristic areas 301 and 302 of FIG. 3, based on the distance-voltage characteristics of a distance measurement sensor to create first and second grid maps, respectively, and then combine an element of the first grid map with an element of the second grid map, thereby generating a complex grid map.

For this operation, the map building apparatus 1400 may include a first base map builder 401, a second base map builder 402, a map combiner 403, an intersection extractor 404, a candidate map builder 1405, and a map selector 1406, for example.

The first base map builder 401 may select the first characteristic area with reference to the distance-voltage characteristics of the distance measurement sensor, and thus generate a first grid map using the characteristics of the first characteristic area. For example, the first grid map may be a grid map corresponding to a short-distance area represented by the distance-voltage characteristics of the distance measurement sensor relating to distances shorter than a threshold distance.

The second base map builder may select the second characteristic area with reference to the distance-voltage characteristics of the distance measurement sensor, and thus generate a second grid map using the characteristics of the second characteristic area. For example, the second grid map may be a grid map corresponding to a long-distance area represented by the distance-voltage characteristics of the distance measurement sensor relating to distances longer than the threshold distance.

The map combiner 403 may combine the first grid map with the second grid map. For example, the map combiner 403 may create a complex grid map by overlapping the second grid map with the first grid map.

The intersection extractor 404 may extract intersections between the first grid map and the second grid map.

The candidate map builder 1405 may select any one of a line of the first grid map or the second grid map for each section/area between respective neighboring intersections among the intersections extracted by the intersection extractor 404, thus creating a plurality of candidate grid maps. At this time, the candidate map builder 1405 may select the plurality of candidate grid maps by alternately selecting the lines of the first grid map and the lines of the second grid map.

The map selector 1406 may then select one of the candidate grid maps as a true grid map. The criteria for this selection will be described further below.

Example descriptions of the operations of the first base map builder 401, the second base map builder 402, the map combiner 403, and the intersection extractor 404 have been described above with reference to FIGS. 5 though 8, and accordingly the same will not be repeated below. A procedure for building such candidate grid maps and selecting any one of the candidate grid maps as a true grid map will now be described in more detail with reference to FIGS. 8, 11, and 12.

Figure 11:
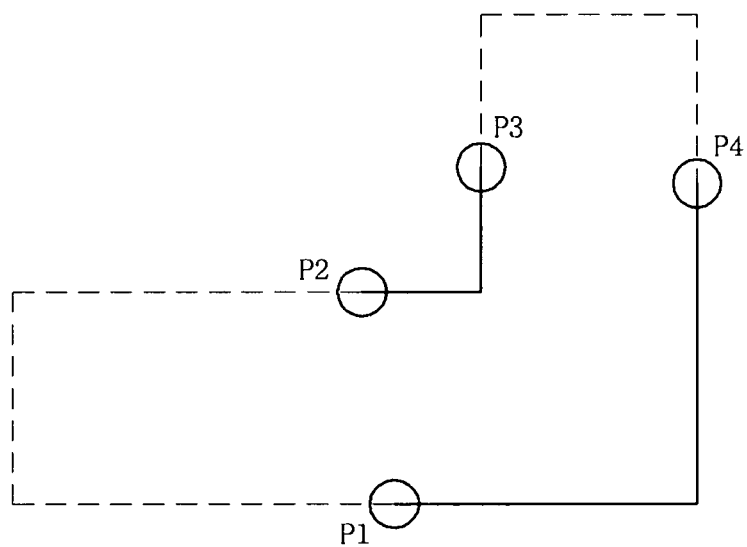
FIG. 11 illustrates a candidate grid map according to an embodiment.
Figure 12:
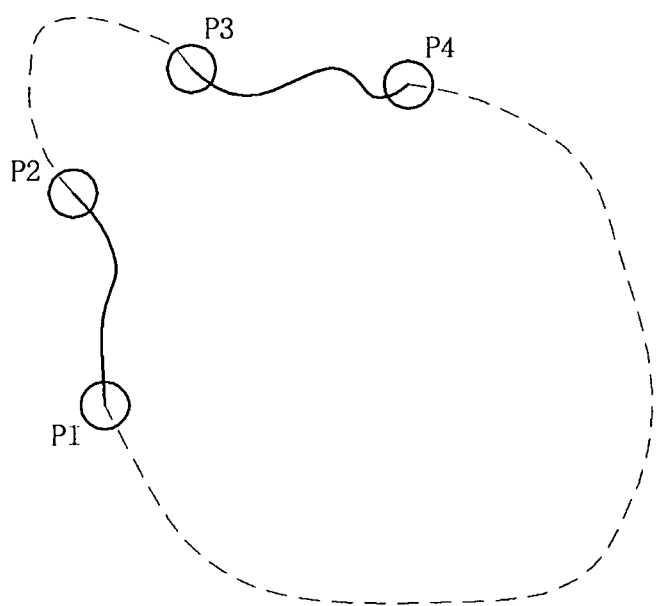
FIG. 12 illustrates a candidate grid map according to an embodiment.

FIGS. 11 and 12 illustrate two candidate grid maps that are generated based on a complex grid map, for example, as illustrated in FIG. 8, according to one or more embodiments. The embodiments illustrated in FIGS. 11 and 12 are examples related to a method in which the candidate map builder 1405 selects the lines of a map and generates candidate maps alternately or in a toggle manner.

For example, if the dashed line is selected for the first section P1-P2 in FIG. 8, a candidate grid map illustrated in FIG. 11 can be built by selecting a solid line, a dashed line and a solid line, respectively, for the second section P2-P3, the third section P3-P4, and the fourth section P4-P1.

In addition, if a solid line is selected for the first section P1-P2 in FIG. 8, a candidate grid map illustrated in FIG. 12 can be built by selecting a dashed line, a solid line, and a dashed line, respectively, for the second section P2-P3, the third section P3-P4, and the fourth section P4-P1.

The map selector 1406 selects from one of the candidate grid maps, as illustrated in FIGS. 11 and 12, a true grid map.

The determination on which grid map is the true map may depend on various criteria.

For example, a candidate map having more continuous lines, with respect to intersections, may be selected as a true grid map. A representative line among such lines having continuity is a straight line, and mathematically, if the sign of a differential value of an intersection with respect to the left-hand limit is equal to the sign of a differential value of the intersection with respect to the right-hand limit, it can be determined that a line including the intersection has continuity with respect to the intersection, and otherwise, it can be determined that the line including the intersection has discontinuity.

As another example, a candidate map having more lines including intersections, from among the candidate grid maps, may be selected as a true grid map.

Comparing FIG. 11 with FIG. 12, based on the determination criterion, the candidate grid map illustrated in FIG. 11 may be determined to meet the determination criterion compared to the candidate grid map illustrated in FIG. 12. Accordingly, the map selector 1406 may select the candidate grid map illustrated in FIG. 11 as the true grid map. Through comparison of FIG. 11 with FIG. 5, it will be understood how the peripheral environment of A is properly represented as a grip map.

Figure 13:
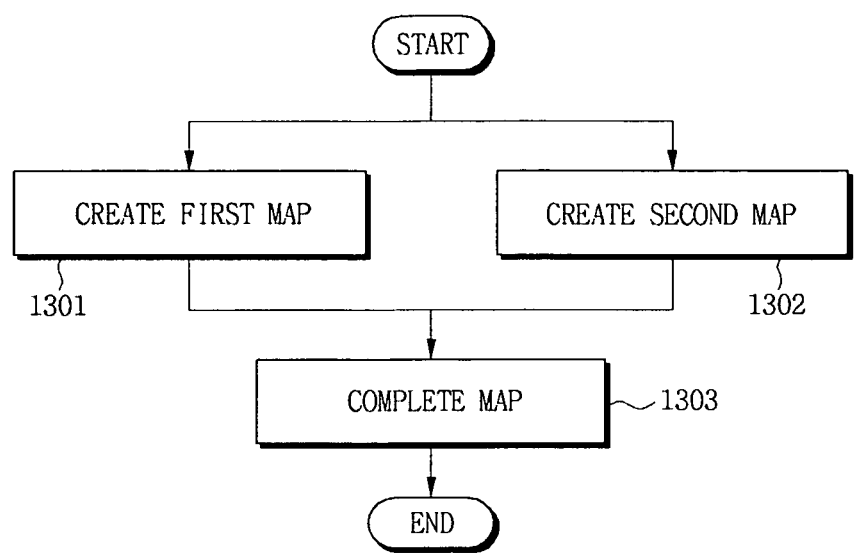
FIG. 13 is a flowchart of a map building method according to an embodiment.

FIG. 13 is a flowchart of a map building method according to an embodiment. Referring to FIG. 13, first and second maps are built by selecting different characteristic areas based on the distance-voltage characteristics of a distance measurement sensor (operations 1301 and 1302). For example, referring to FIG. 4, the first base map builder 401 and the second base map builder 402 may create base grid maps, respectively, as illustrated in FIGS. 6 and 7.

Successively, by combining a part of the first map with a part of the second map, a third map may be completed (operation 1303). Completing the third map means that the third map is selectively generated by combining a aspects of the first map with aspects of the second map.

Figure 14:
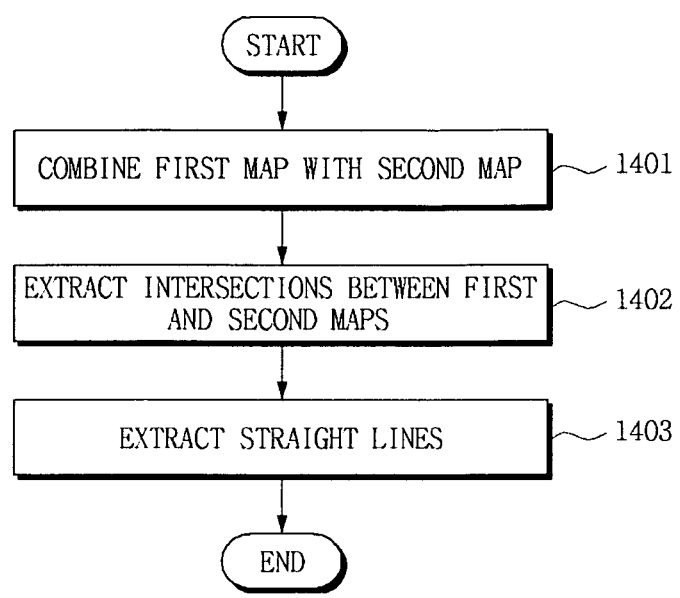
FIG. 14 is a flowchart of an operation of completing a map, according to an embodiment.

FIG. 14 is a flowchart of the operation 1303 of completing the third map, according to an embodiment. Referring to FIG. 14, first, the first map is combined with the second map (operation 1401). For example, referring to FIG. 4, the map combiner 403 may generate a complex map illustrated in FIG. 8.

Then, intersections between the first and second maps are extracted (operation 1402). For example, the intersection extractor 404 may extract intersections, such as the intersections P1 through P4 of FIG. 8.

Successively, for example, straight lines among the lines of the first and second maps may be extracted for each portion of the maps, with the portion being defined as areas between neighboring intersections (operation 1403). For example, the straight line extractor 405 may extract straight lines, thus completing a third map, such as the map illustrated in FIG. 9.

Figure 15:
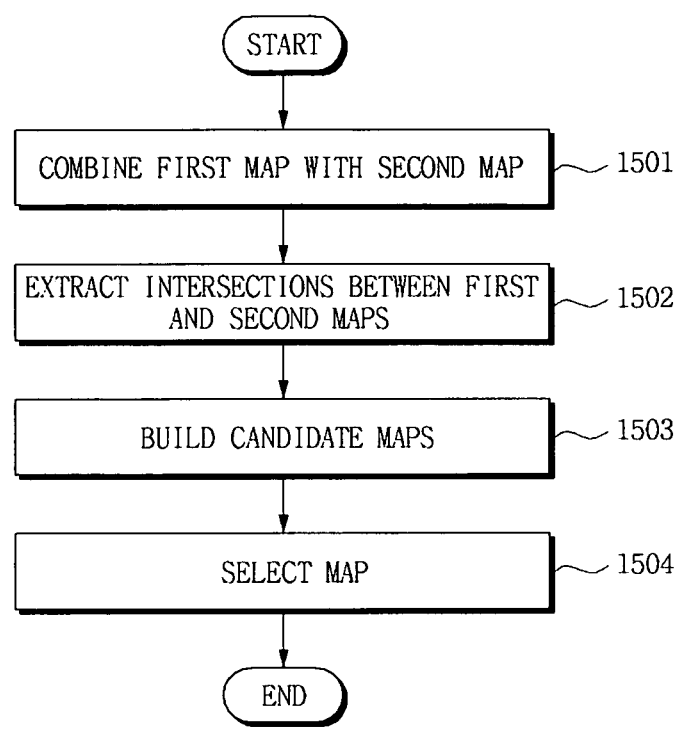
FIG. 15 is a flowchart of an operation of completing a map, according to an embodiment.

FIG. 15 is a flowchart of the operation 1303 of completing the map, according to an embodiment. Referring to FIG. 15, the first map is combined with the second map (operation 1501). For example, the map combiner 403 may generate a complex map illustrated in FIG. 8.

Successively, for example, intersections between the first and second maps may be extracted (operation 1502). For example, the intersection extractor 404 may extract intersections, such as the intersections P1 through P4 of FIG. 8.

Next, any one among the line of the first map and that of the second map is selected for each defined area between neighboring intersections, for example, thereby building at least two candidate maps (operation 1503). For example, the candidate map builder 1405 may create candidate maps illustrated in FIGS. 11 and 12.

Successively, one of the candidate maps is selected as a true map (operation 1504). For example, the map selector 1406 may select the candidate map illustrated in FIG. 11 as a true map from among the candidate maps illustrated respectively in FIGS. 11 and 12. At this time, criteria for selecting the true map may depend on which candidate map has more lines that are continuous with respect to intersections or which candidate map has more straight lines with respect to intersections, noting that alternative embodiments are equally available.

In addition to the above described embodiments, embodiments can also be implemented through computer readable code/instructions in/on a medium, e.g., a computer readable medium, to control at least one processing device to implement any above described embodiment. The medium corresponds to any defined, measurable, and tangible structure permitting the storing and/or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A map building apparatus, including one or more processing devices, the apparatus comprising:
   a base map building unit using the one or more processing devices configured to generate a first map and a second map based on at least two different distances represented by a same output signal of a measurement sensor, the output signal being an output distance measurement indicating signal; and a final map building unit configured to selectively combine portions of the first map with portions of the second map to create a third map.

2. The map building apparatus of claim 1, wherein the output distance measurement indicating signal represents the at least two different distances for the same output signal according to respective different characteristic areas along a defined distance-voltage characteristic curve of the measurement sensor, with the different characteristic areas being separated along the distance-voltage characteristic curve based on a point on the distance-voltage characteristic curve where the distance measurement sensor outputs a peak voltage.

3. The map building apparatus of claim 1, wherein the output distance measurement indicating signal represents the at least two different distances for the same output signal according to respective different characteristic areas along a defined distance-voltage characteristic curve of the measurement sensor, and wherein the base map building unit comprises:
 a first base map builder to generate the first map based on distances, represented by the output distance measurement indicating signal according to a first characteristic area of the different characteristic areas of the distance-voltage characteristic curve, increasing proportionally with an increase in output voltage of the output distance measurement indicating signal; and
 a second base map builder to generate the second map based on distances, represented by the output distance measurement indicating signal according to a second characteristic area of the different characteristic areas of the distance-voltage characteristic curve, increasing proportionally with a decrease in output voltage of the output distance measurement indicating signal.

4. The map building apparatus of claim 1, wherein the final map building unit comprises:
 a map combiner configured to combine the first map with the second map;
 an intersection extractor configured to extract intersections between the first map and the second map; and
 a straight line extractor configured to select straight lines from among lines of the first and second maps for each section which is defined as an area between neighboring intersections of the extracted intersections, to create the third map using the selected straight lines.

5. The map building apparatus of claim 1, wherein the final map building unit comprises:
 a map combiner configured to combine the first map with the second map;
 an intersection extractor configured to extract intersections between the first map and the second map;
 a candidate map builder configured to select any one of a line of the first map and a line of the second map for each section which is defined as an area between neighboring intersections of the extracted intersections, to create at least two candidate maps using the selected lines; and
 a map selector configured to select a map from the at least two candidate maps as the third map.

6. The map building apparatus of claim 5, wherein the candidate map builder selects a line of the first map and a line of the second map, alternately, for each section.

7. The map building apparatus of claim 5, wherein the map selector selects a candidate map having more continuous lines with respect to the intersections from the at least two candidate maps as the third map.

8. The map building apparatus of claim 5, wherein the map selector selects a candidate map having more straight lines with respect to the intersections from the at least two candidate maps as the third map.

9. The map building apparatus of claim 5, wherein the map selector selects a candidate map having more straight lines including the intersections from the at least two candidate maps as the third map.

10. The map building apparatus of claim 1, wherein the first and second maps are grid maps made up of same sized grid cells.

11. A map building apparatus comprising:
 a base map building unit using the one or more processing devices configured to generate a first map and a second map based on an output distance measurement indicating signal, of a measurement sensor, with the output distance measurement indicating signal representing at least two different distances for a same output signal; and
 a final map building unit to selectively combine portions of the first map with portions of the second map to create a third map,
 wherein the first map and the second map overlap.

12. A map building method comprising:
 generating, using one or more processing devices, a first map and a second map based on at least two different distances represented by a same output signal of a measurement sensor, the output signal being an output distance measurement indicating signal; and
 building a third map by selectively combining portions of the first map with portions of the second map to create the third map.

13. The map building method of claim 12, wherein the output distance measurement indicating signal represents the at least two different distances for the same output signal according to respective different characteristic areas along a defined distance-voltage characteristic curve of the measurement sensor, with the different characteristic areas being separated along the distance-voltage characteristic curve based on a point on the distance-voltage characteristic curve where the distance measurement sensor outputs a peak voltage.

14. The map building method of claim 12, wherein the output distance measurement indicating signal represents the at least two different distances for the same output signal according to respective different characteristic areas along a defined distance-voltage characteristic curve of the measurement sensor,
 with the generating of the first map including generating the first map based on distances, represented by the output distance measurement indicating signal according to a first characteristic area of the different characteristic areas of the distance-voltage characteristic curve, increasing proportionally with an increase in output voltage of the output distance measurement indicating signal, and
 with the generating of the second map including generating the second map based on distances, represented by the output distance measurement indicating signal according to a second characteristic area of the different characteristic areas of the distance-voltage characteristic curve, increasing proportionally with a decrease in output voltage of the output distance measurement indicating signal.

15. The map building method of claim 12, wherein the building of the third map comprises:
 combining the first map with the second map;

extracting intersections between the first map and the second map;

selecting straight lines from among lines of the first and second maps for each section which is defined as an area between neighboring intersections of the extracted intersections; and creating the third map using the selected straight lines.

16. The map building method of claim 12, wherein the building of the third map comprises:

combining the first map with the second map;

extracting intersections between the first map and the second map;

selecting any one of a line of the first map and a line of the second map for each section which is defined as an area between neighboring intersections of the extracted intersections;

creating at least two candidate maps using the selected lines; and selecting a map from the at least two candidate maps as the third map.

17. The map building method of claim 16, wherein the selecting of the map from the at least two candidate maps comprises selecting a line of the first map and a line of the second map, alternately, for each section.

18. The map building method of claim 16, wherein the selecting of the map from the at least two candidate maps comprises selecting a candidate map having more continuous lines with respect to the intersections from the at least two candidate maps as the third map.

19. The map building method of claim 16, wherein the selecting of the map from the at least two candidate maps comprises selecting a candidate map having more straight lines with respect to the intersections from the at least two candidate maps as the third map.

20. The map building method of claim 16, wherein the selecting of the map from the at least two candidate maps comprises selecting a candidate map having more straight lines including the intersections from the at least two candidate maps as the third map.

21. The map building method of claim 12, wherein the first and second maps are grid maps made up of same sized grid cells.

22. The map building method of claim 12, wherein the first map and the second map overlap.

* * * * *